(12) United States Patent  
Danninger

(10) Patent No.: US 8,285,732 B2
(45) Date of Patent: Oct. 9, 2012

(54) METHOD AND SYSTEM FOR PROVIDING THEMES FOR SOFTWARE APPLICATIONS

(75) Inventor: Michael Danninger, Landau (DE)

(73) Assignee: SAP AG, Walldorf (DE)

( * ) Notice: Subject to any disclaimer, the term of this patent is extended or adjusted under 35 U.S.C. 154(b) by 254 days.

(21) Appl. No.: 11/641,429

(22) Filed: Dec. 18, 2006

(65) Prior Publication Data

US 2008/0148183 A1    Jun. 19, 2008

(51) Int. Cl.
*G06F 17/30* (2006.01)
(52) U.S. Cl. .................. 707/758; 707/706; 715/700
(58) Field of Classification Search .............. 707/758, 707/706; 715/700
See application file for complete search history.

(56) References Cited

U.S. PATENT DOCUMENTS

| | | | |
|---|---|---|---|
| 6,016,394 A | 1/2000 | Walker | |
| 6,088,717 A | 7/2000 | Reed et al. | |
| 6,091,411 A | 7/2000 | Straub et al. | |
| 6,104,391 A * | 8/2000 | Johnston et al. | 715/745 |
| 6,188,399 B1 * | 2/2001 | Voas et al. | 715/723 |
| 6,731,310 B2 | 5/2004 | Craycroft et al. | |
| 6,751,776 B1 | 6/2004 | Gong | |
| 6,772,167 B1 * | 8/2004 | Snavely et al. | 707/102 |
| 6,865,574 B1 | 3/2005 | McCullough | |
| 6,934,915 B2 | 8/2005 | Rudd et al. | |
| 6,986,030 B2 | 1/2006 | Shmueli et al. | |
| 6,986,107 B2 | 1/2006 | Hanggie et al. | |
| 7,028,262 B2 | 4/2006 | Estrada et al. | |
| 7,093,009 B2 | 8/2006 | Guterman | |
| 2004/0100490 A1 * | 5/2004 | Boston et al. | 345/744 |
| 2004/0113930 A1 * | 6/2004 | Hawley et al. | 345/700 |
| 2005/0120313 A1 * | 6/2005 | Rudd et al. | 715/866 |
| 2006/0253586 A1 * | 11/2006 | Woods | 709/226 |
| 2007/0005576 A1 * | 1/2007 | Cutrell et al. | 707/3 |
| 2007/0100882 A1 * | 5/2007 | Hochwarth et al. | 707/104.1 |
| 2007/0157093 A1 * | 7/2007 | Karcher | 715/707 |
| 2008/0148150 A1 * | 6/2008 | Mall | 715/707 |

* cited by examiner

*Primary Examiner* — Mahesh Dwivedi
(74) *Attorney, Agent, or Firm* — Kenyon & Kenyon LLP

(57) ABSTRACT

A method includes providing a plurality of services to a user by a software application, each service having a plurality of service parameters and being capable of displaying a plurality of data to the user. The method also includes providing a data theme selection to the user, the data theme selection including selecting a data theme from among a plurality of available data themes. The method also includes setting, for each data theme parameter of the selected data theme, the service parameters associated with and according to that data theme parameter. The method also includes filtering, for each of the plurality of services, the display of the plurality of data as a function of the at least one associated data property according to the service parameters of that service as set by the selected data theme.

12 Claims, 5 Drawing Sheets

104⬉  ⬐106

| Name | Address | Start Date |
|---|---|---|
| Jack B. | 42 Ave. A | 12/19/86 |
| Seth K. | 19 2nd St. | 4/23/92 |
| Anne D. | 6 Rose Place | 3/1/04 |

402a → Jack B. row; 402b → Seth K. row; 402c → Anne D. row
402d, 402e, 402f → Address cells
402g, 402h, 402i → Start Date cells

| Name | Address |
|---|---|
| Jack B. | 42 Ave. A |
| Seth K. | 19 2nd St. |
| Anne D. | 6 Rose Place |

402a, 402b, 402c → Name rows; 402d, 402e, 402f → Address rows

| Name | Address | Start Date |
|---|---|---|
| Jack B. | 42 Ave. A | 12/19/86 |
| Seth K. | 19 2nd St. | 4/23/92 |

402a, 402b → Name rows; 402d, 402e → Address; 402g, 402h → Start Date

FIG. 4C

METHOD AND SYSTEM FOR PROVIDING THEMES FOR SOFTWARE APPLICATIONS

BACKGROUND INFORMATION

Services provided by a computing system may include any type of functionality provided by the system and may be implemented at least in part by software applications of the system. For example, a particular service may include a business functionality and be implemented by an application which includes business logic to perform the business functionality. Some systems may also provide the ability to customize properties of services provided to the user. However, in a system which provides a plurality of services to the user, customization of each of the plurality of services may be a burdensome task for the user, especially if there are a relatively large number of services, or if there are a relatively large number of customizable properties.

BRIEF DESCRIPTION OF THE DRAWINGS

So that features of the present invention can be understood in detail, a description of the invention can be had by reference to embodiments, some of which are illustrated in the appended drawings. It is to be noted, however, that the appended drawings illustrate only particular embodiments of the invention and are therefore not to be considered limiting of its scope, for the invention may admit to other equally effective embodiments.

FIGS. 4A-C are schematic diagrams depicting exemplary embodiments of a selective display of data according to data properties.

DETAILED DESCRIPTION

Figure 1:
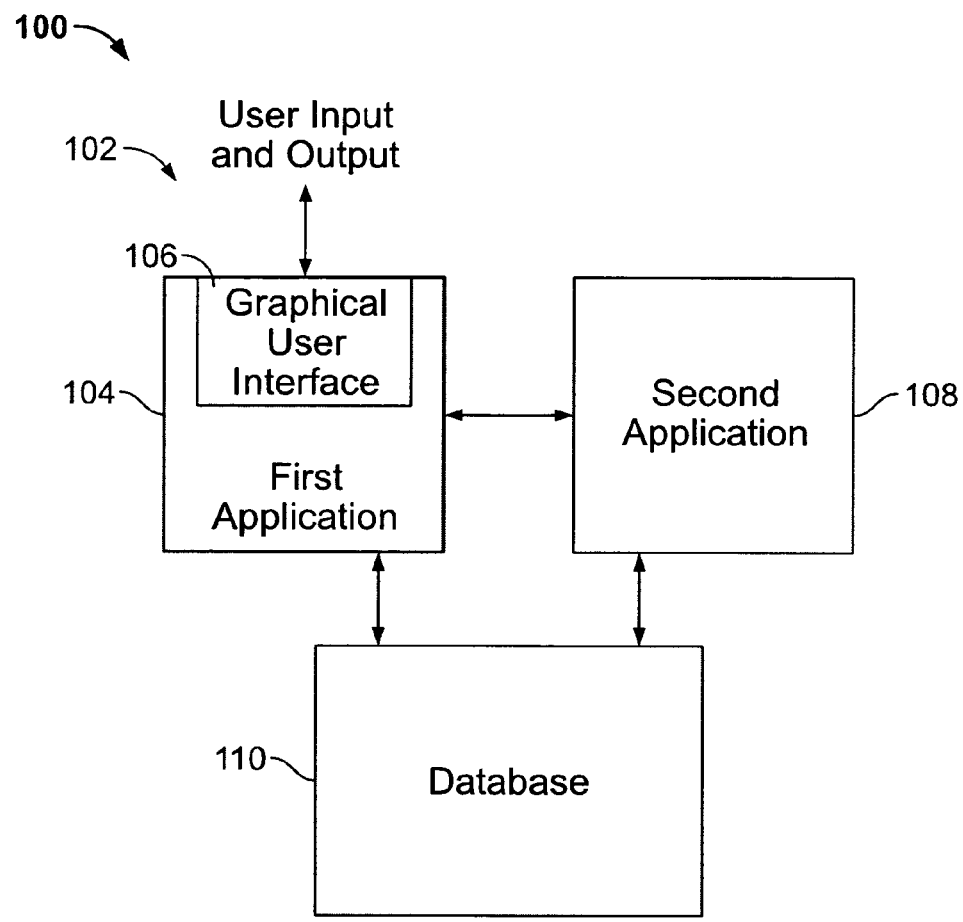
FIG. 1 is a schematic diagram depicting one embodiment of a software architecture.

FIG. 1 depicts one embodiment of a software architecture 100. The depicted exemplary embodiment of the software architecture 100 comprises a plurality of software components 102, including a first software application 104, a second software application 108 and a database 110. The first application 104 is capable of receiving input from a user at a graphical user interface 106, providing output to the user, and communicating with the second application 108 and the database 110. The second application 108 is capable of communicating with the first application 104 and the database 110. Both the first and second applications 104, 108 are capable of performing a service 506 (shown in FIG. 5) requested by the user at the first application 104. In one embodiment, the performing of the service 506 includes accessing the database 110. Other embodiments of the software architecture 100 are also possible. For example, the architecture 100 may comprise only a single application or other configurations of a plurality of applications.

Figure 2:
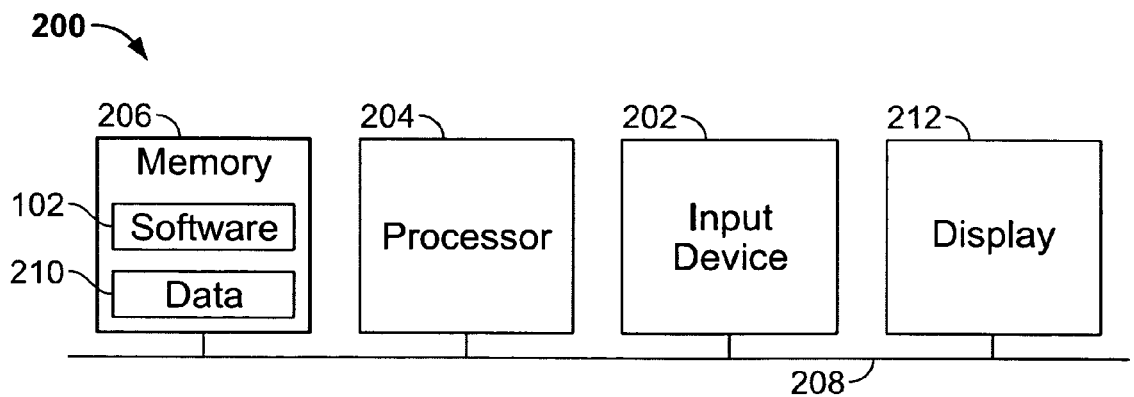
FIG. 2 is a schematic diagram depicting one embodiment of a computing environment.

The software architecture 100 runs in, and is part of, a computing environment 200, an exemplary embodiment of which is depicted in FIG. 2. The depicted embodiment of the computing environment 200 comprises an input device 202, processor 204, memory 206, communication line 208 and display 212. The input device 202 comprises at least one of: a keyboard, a mouse, a voice activated controller, an optical controller, an infrared controller, or other suitable input device. The memory 206 comprises at least one of: a random access memory, a disk storage memory, or other suitable memory. The display 212 comprises at least one of: a monitor, a television, a video projector, or other suitable display device. The memory 206 further comprises data 210 and the software components 102, which are stored in the memory 206 at least at some moment in time. The software components 102 comprise computer program instructions which may be accessed and executed by the processor 204. The software components 102 are implemented in any suitable software language such as, for example, Java, ABAP, C, and C++. The data 210 optionally comprises data which is accessible by or integral to the database 110.

The memory 206, processor 204, input device 202 and display 212 are connected together and communicate with each other by means of the communication line 208. In one embodiment, the communication line 208 comprises a system bus, and the computing environment 200 comprises a single computer. In another embodiment, the communication line 208 comprises a network element, and the computing environment 200 comprises a distributed computing environment. In one embodiment in which the computing environment 200 is distributed, the memory 206, processor 204, input device 202 and display 212 are optionally distributed across different locations. In one embodiment in which the computing environment 200 is distributed, the computing environment 200 optionally comprises a plurality of some or all of the memory 206, processor 204, input device 202 and display 212. Other embodiments of the computing environment 200 are also possible.

The software components 102 comprise computer program instructions, which when executed by the processor 204, enable the performance of a method 300 (shown in FIG. 3) of providing themes 502 (shown in FIG. 5) for software applications. In one embodiment, a computer-readable medium comprises the computer program instructions which enable the performance of the method 300. In one embodiment, a system comprises means to perform each of the steps of the method 300. For example, in one embodiment, the means to perform each of the steps of the method 300 comprise elements of the computing environment 200.

Figure 3:
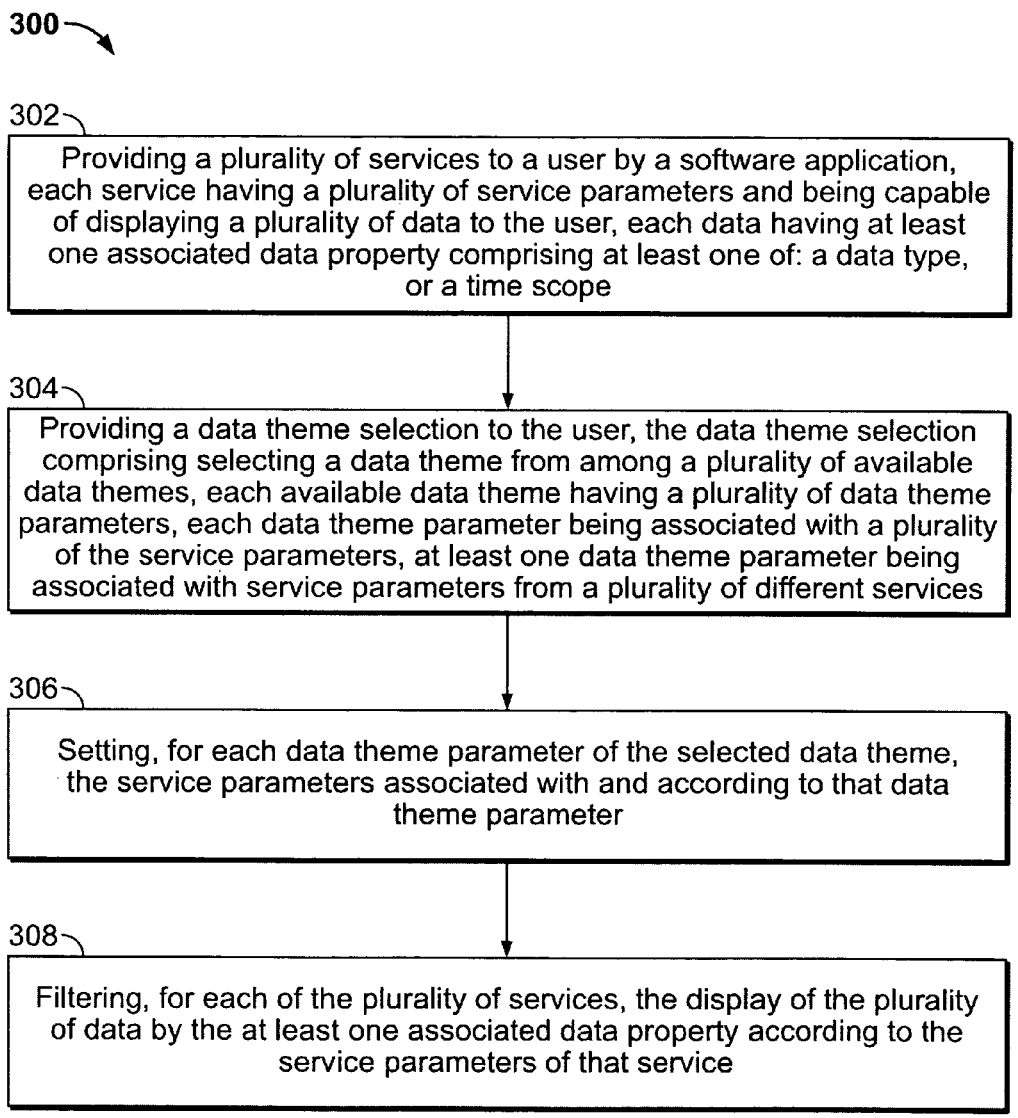
FIG. 3 is a flow chart depicting a schematic representation of one embodiment of a method.

FIG. 3 is a flow chart depicting a schematic representation of one embodiment of the method 300. In the depicted embodiment, at step 302 a plurality of services 506 are provided to the user by one of the software components 102, for example, the first software application 104. Each of the plurality of services 506 are capable of displaying a plurality of unitary pieces of data 402 (shown in FIG. 4) to the user. For example, a particular service 506 may retrieve or process data 402 from the database 110 and display the retrieved or processed data 402 to the user. The possible services 506 are many in type and nature, including any type of functionality useful to an organization such as, for example, a business, educational institution, non-profit, and individual user. Exemplary services 506 include payroll processing, employee hiring, and employee termination. Such services 506 perform functionality by the software architecture 100 and computing environment 200 which is needed or desired in regards to, for example, the payroll processing, employee hiring and employee terminating by the organization.

Each piece of data 402 displayed by the services 506 in step 302 has at least one associated data property. In one embodiment, the at least one associated data property is a plurality of associated data properties. In one embodiment, the at least one data property comprises at least one of: a data type, or a time scope. In one embodiment, the at least one data property which is a plurality of data properties comprises the data type and the time scope.

The data type is a classification of the piece of data 402 according to its meaning within the service 506 or its use within the functionality provided by the service 506. For example, for a service 506 related to a human resources business functionality dealing with employees of an organization, or people otherwise associated with the organization, the data type can include various types of information about a person such as the person's address, date of birth, identification numbers, work start date, work end date, etc. In one embodiment, the data type of each piece of data 402 displayed by the services in step 302 is one of a plurality of different possible data types.

The time scope of a piece of data 402 displayed in step 302 is a classification of the piece of data 402 according to its time dependence. In one embodiment, the time scope of each piece of data 402 is the period of time for which the data 402 is valid within the scope of the functionality of the service 506. For example, a particular piece of data 402 may be a portion of an employee profile displayed as part of a particular service 506 provided to a manager of employees. In such an exemplary service 506, the manager may wish to view a collection of employee profiles in some time dependent manner, such as viewing profiles only of current employees, or viewing profiles only of employees of a certain time period. The time scope, in such an exemplary scenario, is related to and comprises the period of employment of the employee. In one embodiment, the time scope of each piece of data 402 includes a point in time at which the data 402 originates or begins to be valid within the scope of the functionality of the service 506. For example, in the exemplary service 506 in which the manager views a collection of employee profiles based on some time-dependent criteria, the time scope of a particular piece of data 402 of the employee profile may comprise the date at which the employee's employment began. In one embodiment, the time scope of the each piece of data 402 includes a point in time at which the data 402 ends or ceases to be valid within the scope of the functionality of the service 506. For example, in the exemplary service 506 in which the manager views a collection of employee profiles based on some time-dependent criteria, the time scope of a particular piece of data 402 of the employee profile may comprise the date at which the employee's employment ceased.

Figure 5:
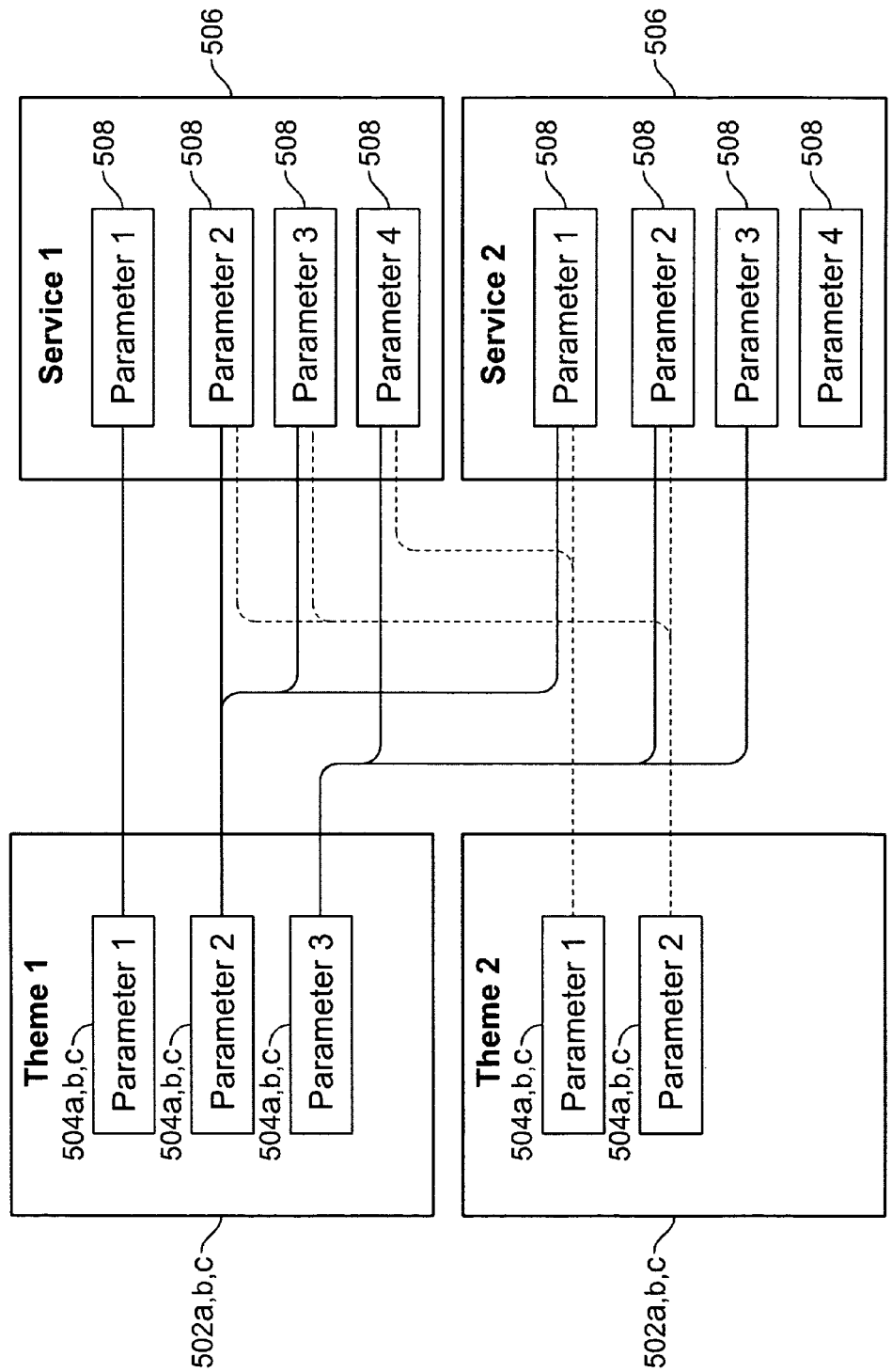
FIG. 5 is a schematic diagram depicting one embodiment of an association between theme parameters, of a plurality of themes, with service parameters of a plurality of services.

Each service 506 provided to the user by the software component 102 in step 302 has a plurality of service parameters 508 (shown in FIG. 5). Each service parameter 508 controls some aspect of a customization of the service 506. In one embodiment, the service parameters 508 determine whether or not certain pieces of data 402 are displayed during a performance of the service 506. For example, in one embodiment in which the service parameters 508 determine data visibility, the service parameters 508 determine data visibility of a particular piece of data 402 according to the at least one data property associated with that particular piece of data 402.

In one embodiment, the service parameter 508 determines the display of data 402 according to data type. For example, in one embodiment, there is a service parameter 508 associated with each possible data type the service 506 is capable of displaying, and the service parameter 508 determines whether or not pieces of data 402 having that associated data type are displayed by the service 506. Such a service parameter 508 can be set in a first state, for example an on state, to control the service 506 to display data 402 of the associated data type, and can be set in a second state, for example an off state, to control the service 506 to not display data 402 of the associated data type. In an alternative embodiment, a service parameter 508 can be generally associated with the data type data property, and have a value, or values, that determines, or determine, for example, by identifying, which data types are displayed.

In one embodiment, the service parameter 508 determines the display of data 402 according to time scope. The service parameter 508 can specify a particular time scope, and thereby determine whether or not data 402 having a time scope indicated by, or matching, the particular time scope specified by the service parameter 508 is displayed by the service 506. In an exemplary embodiment, the service parameter 508 can optionally be set to specify at least one of: a start time of the time scope, an end time of the time scope, or a time duration of the time scope. In the exemplary embodiment, pieces of data 402 having a time scope matching the at least one of the start time, end time or time duration specified by the service parameter 508 are displayed, and pieces of data 402 having a time scope not matching the at least one of the start time, end time or time duration specified by the service parameter 508 are not displayed.

FIGS. 4A-C depict exemplary embodiments of the selective display of data 402 according to the data properties. In FIG. 4A, the graphical user interface 106 of the first application 104 displays nine specific pieces of data 402a-i. Each of specific pieces of data 402a-c have a 'name' data type, each of specific pieces of data 402d-f have an 'address' data type, and each of specific pieces of data 402g-i have a 'start date' data type. Additionally, each of specific pieces of data 402a,d,g have a time scope that begins at the indicated start date 12/19/86; each of specific pieces of data 402b,e,h have a time scope that begins at the indicated start date 4/23/92; and each of specific pieces of data 402c,f,i have a time scope that begins at the indicated start date 3/1/04. In FIG. 4B, a particular service parameter 508 has determined that data 402 having the 'start date' data type is not to be displayed. In FIG. 4C, a particular service parameter 508 has determined that data 402 having a time scope including a beginning time having a value of later than 4/23/92 is not to be displayed.

In the embodiment depicted in FIG. 3, the method 300 proceeds to step 304 after step 302. However, the order of steps 302 and 304 can vary. Step 304 can occur before, after or concurrently with step 302. At step 304, the user is provided with the opportunity to select a data theme 502a (shown in FIG. 5) from among a plurality of available data themes 502a. Providing the data theme selection to the user results in the user selecting a specific data theme 502a from among the plurality of available data themes 502a. The data theme 502a associates the setting of a plurality of service parameters 508 with a relatively smaller number of associated data theme parameters 504a (shown in FIG. 5). By selecting the data theme 502a from among the plurality of available data themes 502a, the user is able to determine the setting of the plurality of associated service parameters 508, and thus determine the display properties of a plurality of pieces of data 402 controlled by the service parameters 508, with a single selection. One benefit of controlling the display properties of a plurality of pieces of data 402 with a single selection is that the potential burden on the user of individually setting the plurality of service parameters 508 is alleviated.

Each data theme 502*a* of the plurality of available data themes 502*a* has at least one data theme parameter 504*a*. In one embodiment, each data theme 502*a* has a plurality of data theme parameters 504*a*. The data theme parameter 504*a* is a meta parameter that determines the setting of a plurality of associated service parameters 508 when a data theme 502*a* is selected. That is, the state or value of the plurality of associated service parameters 508 is dependent on the state or value of the corresponding data theme parameter 504*a* on which they depend. Because each data theme parameter 504*a* is associated with a plurality of different service parameters 508, the user is given access to control of many different service parameters 508 from a relatively smaller number of data theme parameters 504*a*.

Each data theme 502*a* defines how its data theme parameters 504*a* are associated with service parameters 508. In one embodiment, each of the plurality of data themes 502*a* has a different association of data theme parameters 504*a* with service parameters 508. The selection of a particular data theme 502*a* from among the plurality of available data themes 502*a* thus allows the user to select from among different data display characteristics for the plurality of services 506. A particular data theme 502*a* may be organized, in terms of its association of data theme parameters 504*a* with service parameters 508, to provide a display of only data 402 having a certain data property, such as a certain data type or time scope, to the user by the plurality of services 506. In one exemplary scenario, if a manager at a company is reviewing his or her engineering staff to determine a team of engineers suitable for developing a particular product involving a particular technology, the manager may use one service 506 that provides an employee profile viewing functionality, and another service 506 that provides an employee task assignment functionality. In this exemplary scenario, the manager can select a data theme 502*a* that determines that only employees who are engineers will be shown by both the profile viewing service 506 and the task assignment service 506. The selected data theme 502*a* may also further limit the data 402 displayed by the services 506 to include only engineers having experience with the particular technology. The selected data theme 502*a* may also further limit the data 402 displayed by the services 506 to only include data 402 related to the engineer's technical skills, and not other information potentially unrelated to the manager's task, such as the engineer's home addresses or birthday.

In another exemplary scenario, it may be useful for the manager to be provided with a selection from among a plurality of data themes 502*a*, each of which effectively groups employees into different categories that provides the manager with quick access to data 402 in a way that aids him or her in making management decisions. For example, the manager can use the data themes 502*a* to selectively view either experienced or inexperienced employees. Numerous other examples of data display characteristics provided by data themes 502*a* are possible. Moreover, even though the above example may emphasize the use of the data type data property, the data theme 502*a* can also provide data display characteristics according to other data properties such as, for example, the data time scope. Other examples of data display characteristics provided by data themes 502*a* also exist in which a particular data theme 502*a* provides selective data display based not on only a single data property, but instead based on a plurality of different data properties.

In one embodiment, one of the software components 102, for example, the first application 104, provides a dialog to the user to accomplish the providing of the data theme section of step 304. The user can then respond to the presented dialog to select the data theme 502*a*.

In one embodiment, at least one data theme parameter 504*a* of the selected data theme 502*a* is associated with service parameters 508 from a plurality of different services 506. Associating a data theme parameter 504*a* with service parameters 508 from a plurality of different services 506 allows the data theme 502*a* having the data theme parameter 504*a* to achieve widespread control of data display characteristics over the plurality of services 506 with a single data theme selection. In an exemplary scenario in which the plurality of services 506 represents the bulk of computer usage undertaken by the user on a daily basis, the ability to control the data display characteristics of the plurality of different services 506 with a single data theme selection provides the user with a tool to quickly and efficiently change the data display characteristics of the bulk of his or her typical computer usage.

FIG. 5 depicts an exemplary embodiment of an association between data theme parameters 504*a* and service parameters 508 of an exemplary plurality of available data themes 502*a* and plurality of services 506. In the depicted embodiment, a first exemplary available data theme 502*a* has three data theme parameters 504*a* that are associated with service parameters 508 from a plurality of different services 506, that is, a first exemplary service 506 and a second exemplary service 506. Similarly, in the depicted embodiment, a second exemplary available data theme 502*a* has two data theme parameters 504*a* which are associated, in a different manner than for the first exemplary available data theme 502*a*, with service parameters 508 from the plurality of different services 506 including the first exemplary service 506 and the second exemplary service 506.

In one embodiment, each of the plurality of services 506 provided to the user in step 302 provides a different business functionality to the user. In one example of such an embodiment, the providing of each of the plurality of services 506 comprises executing, for each of the plurality of services 506, computer program instructions by the processor 204, the computer program instructions of each service 506 being at least partially different than the computer program instructions executed by the processor 204 in the providing of the other services 506 of the plurality of services 506. Thus, each of the plurality of services 506 provided to the user may have different natures. Additionally, in one embodiment, each of the plurality of services 506 provided to the user is provided by executing a completely different set of computer program instructions than is executed by the providing of the other services 506 of the plurality of different services 506. In an exemplary embodiment, the first service 506 depicted in FIG. 5 is provided by the first application 104, the second service 506 depicted in FIG. 6 is provided by the second application 108, and the first and second applications 104, 108 comprise completely different sets of computer program instructions.

The providing the data theme selection of step 304 selects from among already-defined data themes 502*a*. A defined data theme 502*a* indicates the association and relationship between data theme parameters 504*a* and service parameters 508. FIG. 5, as already discussed, depicts one embodiment of an association between data theme parameters 504*a* and service parameters 508. Additionally, the relationship between the data theme parameter 504*a* and the associated service parameters 508 is also defined by the data theme 502*a*. The relationship between the data theme parameter 504*a* and the service parameters 508 defines how a setting of the data theme parameter 504*a* affects settings of the associated service parameters 508. In one embodiment, the relationship transfers the setting or value of the data theme parameter 504*a* to that of the associated service parameters 508. For example, in one embodiment, the data theme parameter 504*a* is set to one of a plurality of different states, for example, on and off states, and the relationship between the data theme parameter 504*a* and the associated service parameters 508 transfers the state of the data theme parameter 504*a* to the associated service parameters 508. This type of relationship may be appropriate for data theme parameters 504*a* associated with service parameters 508 determining data display according to data type data properties. In another embodiment, the data theme parameter 504*a* is set to a value or a range of values, for example, a time value or a range of time values, and the relationship between the data theme parameter 504*a* and the associated service parameters 508 transfers the value or the range of values of the data theme parameter 504*a* to the associated service parameters 508. This type of relationship may be appropriate for data theme parameters 504*a* associated with service parameters 508 determining data display based on time scope data properties.

In the embodiment depicted in FIG. 3, the method proceeds to step 306 after step 304. At step 306, for each data theme parameter 504*a* of the selected data theme 502*a*, the service parameters 508 associated with that data theme parameter 504*a* are set according to their relationship with that data theme parameter 504*a*. In one embodiment, the setting of step 306 is triggered by the selecting of the data theme 502*a* in response to the providing of the selection of step 304. In other embodiments, the setting of step 306 can be triggered by other actions after the selecting of the data theme 502*a* in response to the providing of the selection of step 304.

In the embodiment depicted in FIG. 3, the method 300 proceeds to step 308 after step 306. At step 308, for each of the plurality of services 506, the display of the plurality of pieces of data 402 by that service 506 is filtered by associated data properties according to the service parameters 508 of that service 506. In the depicted embodiment, the pieces of data 402 which are to be displayed, and the pieces of data 402 which are not to be displayed, will be determined by the selected data theme 502*a*, which determines how the associated service parameters 508 have been set in step 306. The filtering of the display of the data 402 means that only data 402 which has been determined to be displayed is displayed by the display 212. In one embodiment, the filtering of the display of the data 402 comprises transmitting a display signal corresponding to the data 402 which is determined to be displayed to the display 212, and not transmitting a display signal corresponding to the data which has been determined not to be displayed to the display 212.

In one embodiment, the definition of each available data theme 502*a*, including the data theme parameters 504*a* and their associations and relationships to service parameters 508, are provided in at least one data file which is capable of being accessed by at least one of the software components 102, for example, the first application 104. The at least one data file is optionally stored in the memory 206 of the computing environment 200.

In one embodiment, each specific service parameter 508 of a specific service 506 is associated with a specific piece of data 402 displayed by that specific service 506, and the filtering according to the specific service parameter 508, of step 308, filters that specific piece of data 402.

In one embodiment, other data properties instead of, or in addition to, data type and time scope can be used in the steps of the method 300. For example, the service parameters 508 can determine the display visibility of a piece of data 402 according to the other data properties, and the filtering of step 308 can be by the other data properties. In one embodiment, additional data properties include at least one of: data size, or display size. The data size is a measure of the memory size required to store the unitary piece of data 402. The data size is optionally measured in terms of at least one of: bytes, kilobytes, megabytes, gigabytes, terabytes or any other suitable data size unit of measure. The display size is a measure of the physical dimensions needed to display the unitary piece of data 402 on the display 212. The display size is optionally measured in terms of at least one of: inches, feet, centimeters, meters, pixels, or any other suitable display size unit of measure. In one embodiment, the at least one data property associated with each data comprises a plurality of data properties comprising at least two different of: the data type, the time scope, the data size or the display size.

In one embodiment, the method 300 comprises executing computer program instructions of the first application 104 by a first processor 204 which is located at least partially in a computer workstation being used by the user who is provided with the data theme selection of step 304, and the providing the plurality of services 506 of step 302 further comprises accessing the database 110, the database 110 comprising data stored in a portion of the memory 206 and computer program instructions executed by a second processor 204, the portion of the memory 206 and the second processor 204 being located at least partially not in the computer workstation the user is using. Such an embodiment may be beneficial to the performance of the method 300 in a scenario involving a relatively large organization in which the computing environment 200 is a distributed computing environment 200.

In addition to, or instead of, providing a data theme selection to the user, one embodiment the method 300 provides a usability theme selection to the user. The usability theme selection results in selecting a usability theme 502*b* from among a plurality of available usability themes 502*b*. The usability theme 502*b* is similar to the data theme 502*a*, but instead of determining the setting of service parameters 508 that determine the visibility of pieces of data 402, the usability theme 504*b* determines the setting of service parameters 508 that determine the visibility of a plurality of messages 602 (shown in FIG. 6) provided to the user. The service may provide a plurality of different messages 602 to the user during the performance of the service 506. The messages provided by the service optionally include at least one of: help messages 602 that provide help information concerning the usage of the service 506 by the user, information messages 602 that provide information concerning the status of the performance of the service 506, or error messages 602 that provide information concerning errors encountered during the performance of the service 506. In one embodiment, the messages 602 provided by the service comprise the help messages 602 that provide help information concerning the usage of the service 506 by the user.

In a manner similar to data themes 502*a*, usability themes 502*b* each have at least one usability theme parameter 504*b*. In one embodiment, each usability theme 502*b* has a plurality of usability theme parameters 504*b*. Each usability theme parameter 504*b*, as with data theme parameters 504*a*, is associated with a plurality of service parameters 508. As already discussed, each service 506 provided to the user has a plurality of service parameters 508, and each service parameter 508 controls some aspect of customization of the service 506. In embodiments involving data themes 502*a*, the service parameters 508 determine whether or not certain pieces of data 402 are displayed during a performance of the service 506; whereas, in embodiments involving usability themes 502*b*, the service parameters 508 determine whether or not certain messages 602 are displayed during a performance of the service 506.

For example, in one embodiment, each service 506 is capable of displaying a plurality of different messages 602 to the user. Additionally, each unique message 602 may be displayed to the user in a plurality of different circumstances. The circumstance of the display of a particular message 602 optionally includes the occurrence of certain events that trigger the display of that particular message 602. In one embodiment, the service parameters 508 determine visibility of a particular message 602 according to at least one of: the message content, or the message triggering circumstance. In embodiments in which the service parameter 508 determines the display of messages 602 according to message content, there can be a service parameter 508 associated with each possible message content that the service 506 is capable of displaying, and the service parameter 508 determines whether or messages 602 having the associated message content are displayed by the service 506. In embodiments in which the service parameter 508 determines the display of the message 602 according to triggering circumstance, the service parameter 508 can specify a particular triggering circumstance, and thereby determine whether or not messages 602 normally triggered by the circumstance specified by the service parameter 508 are displayed by the service 506.

Figure 6A:
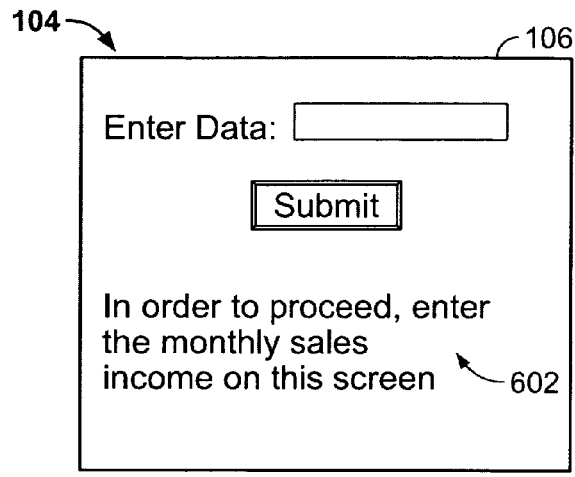
FIGS. 6A-B are schematic diagrams depicting exemplary embodiments of the selective display of messages.
Figure 6B:
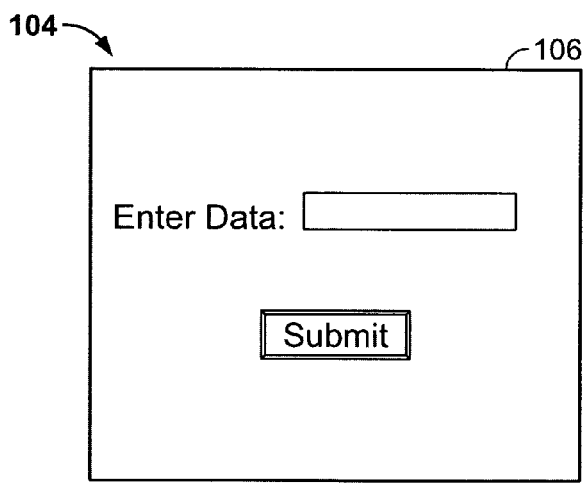

FIGS. 6A-B are schematic diagrams that depict exemplary embodiments of the selective display of messages 602 according to service parameters 508. For example, in FIG. 6A, the graphical user interface 106 of the first application 104 displays a help message 602 which provides information to the user concerning the appropriate response of the user to the displayed configuration of the graphical user interface 106. In FIG. 6A, a service parameter 508 associated with the displayed help message 602 has been set in a manner which determines that the help message 602 is displayed by the service 506. By contrast, in FIG. 6B, the graphical user interface 106 of the first application 104 does not display the help message 602, and the service parameter 508 associated with that particular help message 602 has been set in a manner which determines that that help message 602 is not displayed by the service 506. Although FIGS. 6A-B only depict the selective display of a single message 602 at a particular moment in time, in one embodiment the usability theme parameters 504b of the selected usability theme 502b determine the selective display of a plurality of messages 602, for example, at a plurality of different moments in time during the performance of the service 506.

Each aspect of the method 300, as described above in terms of involving data themes 502a, can be adapted to be performed involving usability themes 502b instead of, or in addition to, data themes 502a. For example, in step 304, the user can be provided with a usability theme selection instead of a data theme selection. Similarly, in step 306, for each usability theme parameter 504b, the associated service parameters 508 can be set according to that usability theme parameter 504b. For example, the definition of the usability theme 502b, as with the data theme 502a, defines the association and relationship between usability theme parameters 504b and service parameters 508. For usability themes 502b, in one embodiment the relationship between the usability theme parameter 504b and the associated service parameters 508 transfers the setting of the usability theme parameter 504b to the associated service parameters 508. For example, a usability theme parameter 504b can be set to a plurality of different states, such as on and off states, which can be transferred to the associated service parameters 508, to determine the display of messages 602 controlled by those service parameters 508, for example displaying messages 602 (on state) or not displaying messages 602 (off state). In step 308, for each of the plurality of services 506, the display of messages 602 is filtered according to the service parameters 508 of that service 506.

In an exemplary embodiment, a specific usability theme 502b determines that all help messages 602 are turned off. In another exemplary embodiment, a specific usability theme 502b determines that all help messages 602 are turned on. In another exemplary embodiment, a specific usability theme 502b determine that some specific help messages 602 are turned on and some specific help messages 602 are turned off.

FIG. 5, in addition to depicting an exemplary embodiment of an association between data theme parameters 504a and service parameters 508, also depicts an exemplary embodiment of an association between usability theme parameters 504b and service parameters 508 of an exemplary plurality of available usability themes 502b and plurality of services 506.

In addition to providing data theme and usability theme selection to the user, one embodiment the method 300 provides a navigation theme selection to the user. The navigation theme selection results in selecting a navigation theme 502c from among a plurality of available navigation themes 502c. The navigation theme 502c is similar to data and usability themes 502a,b, but instead of determining the setting of service parameters 508 that determine the visibility of pieces of data 402, in the case of data themes 502a, or the visibility of messages 602, in the case of usability themes 502b, the navigation theme 502c determines the setting of service parameters 508 that determine which of a plurality of alternative navigation paths 702 the software component 102, for example, the first application 104, presents to the user. A navigation path 702 is a particular set of states 704 of the user interface, e.g., configurations of the graphical user interface 106, presented to the user in the travel from a first state 704 to a second state 704, i.e., from a first graphical user interface configuration to a second graphical user interface configuration. In the travel between certain states 704, the service 506 provides a plurality of different possible navigation paths 702 to the user, the provided path 702 determined by an associated service parameter 508.

In a manner similar to data themes 502a and usability themes 502b, navigation themes 502c each have at least one navigation theme parameter 504c. In one embodiment, each navigation theme 502c has a plurality of navigation theme parameters 504c. Each navigation theme parameter 504c, as with data theme parameters 504a and usability theme parameters 504b, is associated with a plurality of service parameters 508. As already discussed, each service 506 provided to the user has a plurality of service parameters 508, and each service parameter 508 controls some aspect of customization of the service 506. In embodiments involving data themes 502a, the service parameters 508 determine whether or not certain pieces of data 402 are displayed during a performance of the service 506; in embodiments involving usability themes 502b, the service parameters 508 determine whether or not certain messages 602 are displayed during a performance of the service 506; whereas, in embodiments involving navigation themes 502c, the service parameters 508 determine which of alternative navigation paths 702 are presented for travel by the user.

Figure 7A:
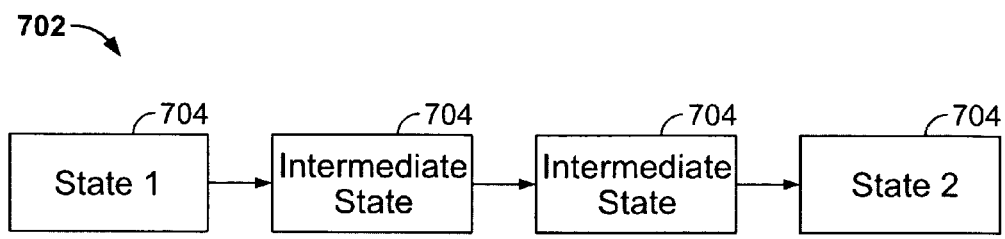
FIGS. 7A-B are schematic diagrams depicting exemplary embodiments of alternative software navigation paths.
Figure 7B:
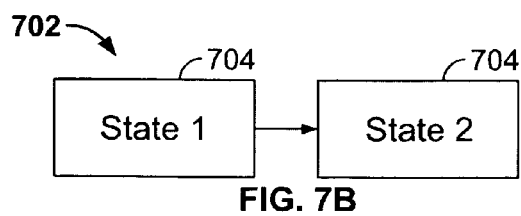

For example, in one embodiment, each service 506 is capable of providing at least one plurality of alternative navigation paths 702 between two states 704 of the service 506. A particular state 704 of the service 506 is the particular configuration of the user interface of one of the software components 102, for example, a particular configuration of the graphical user interface 106 of the fist application 104. The navigation path 702 is the particular sequence of states 704 encountered by the user in traveling from a first state 704 to a second state 704. FIGS. 7A-B are schematic diagrams depicting exemplary embodiments of alternative navigation paths 702. FIG. 7A depicts one embodiment of a first navigation path 702, traveling from the first state 704 to the second state 704, which includes plurality of intermediate states 704 between the first state 704 and the second state 704. Such a navigation path 702 is able to, for example, carefully and slowly present each aspect of some task to the user, and as such may be appropriate for an inexperienced user. By contrast, FIG. 7B depicts one embodiment of a second navigation path 702, also traveling between the first state 704 and the second state 704, but which does not present any intermediate states 704 to the user. Other embodiments of the second navigation path 702 may present, instead of no intermediate states 704, a smaller number of intermediate states 704 than the number of intermediate states 704 presented in the first navigation path 702. The second navigation path 702 may be appropriate for a relatively more experienced user. In embodiments in which there exist alternative navigation paths 702 between two states 704, a service parameter 508 can determine which path 702 is traveled by the user. For example, the service parameter 508 can have a value that identifies which of the alternative paths 702 is traveled.

Each aspect of the method 300, as described above in terms data themes 502*a*, can be adapted to be performed involving navigation themes 502*c* instead of, or in addition to, data themes 502*a*. For example, in step 304, the user can be provided with a navigation theme selection instead of a data theme selection. Similarly, in step 306, for each navigation theme parameter 504*c*, the associated service parameters 508 can be set according to that navigation theme parameter 504*c*. For example, the definition of the navigation theme 502*c*, as with the data theme 502*a*, defines the association and relationship between navigation theme parameters 504*c* and service parameters 508. For navigation themes 502*c*, in one embodiment the relationship between the navigation theme parameter 504*c* and the service parameter 508 transfers the setting of the navigation theme parameter 504*c* to the associated service parameters 508. For example, a navigation theme parameter 504*c* can be set to one of a plurality of different values which each identify one of a plurality of alternative navigation paths 702 for traveling between two states 704, which can be transferred to the associated service parameters 508, to determine the navigation path 702 presented to the user in traveling between the two states 704. In step 308, for each of the plurality of services 506, the navigation paths 702 provided to the user are filtered according to the service parameters 508 of that service 506. That is, the navigation path 702 presented to the user passes through the filtering, whereas the navigation paths 702 not presented to the user are blocked by the filtering.

In an exemplary embodiment, a specific navigation theme 502*c* determines that all presented navigation paths 702 are navigation paths 702 suitable for inexperienced users. In another exemplary embodiment, a specific navigation theme 502*c* determines that all navigation paths 702 are navigation paths 702 suitable for experienced users. In another exemplary embodiment, a navigation theme 502*c* determines that some navigation paths 702 are suitable for experienced users and some are suitable for inexperienced users.

FIG. 5, in addition to depicting exemplary embodiments of an association between data theme parameters 504*a*, or usability parameters 504*b*, and service parameters 508, also depicts an exemplary embodiment of an association between navigation theme parameters 504*c* and service parameters 508 of an exemplary plurality of available navigation themes 502*c* and plurality of services 506.

In one embodiment, the method 300 can be performed with each step involving all of data, usability and navigation themes, or some subset thereof. For example, in step 304, the user can be provided with a data theme selection, a usability theme selection, and a navigation theme selection. Similarly, in step 304, the user can be provided with some subset of a data theme selection, a usability theme selection, and a navigation theme selection. Alternatively, in one embodiment, the method 300 involves only data themes 502*a*. Alternatively, in one embodiment, the method 300 involves only navigation themes 502*b*. Alternatively, in one embodiment, the method 300 involves only usability themes 502*c*.

In one embodiment, the plurality of services 506 whose customization is determined by themes 502 are provided by different software components 102, such as the first and second applications 104, 108.

In one embodiment, the method 300 comprises providing a role selection to the user. The providing of the role selection results in the user selecting a role from among a plurality of available roles. The role selection determines which plurality of services 506, from among a pool of available services 506, are provided to the user. The role selection identifies to the software component 102, for example, the first application 104, the general role that the user has within the organization, and as such which plurality of services 506 are appropriate to be provided to the user. The role selection also optionally assigns a predetermined theme selection for the user. That is, the role selection assigns at least one of a predetermined data theme 502*a*, predetermined usability theme 502*b*, or predetermined navigation theme 502*c* to the user. The assignment of the predetermined theme selection can be in addition to or instead of the providing the theme selection of step 304. For example, the predetermined theme assignment can occur at a moment in time before the providing the theme selection of step 304. In one embodiment, the plurality of available roles optionally includes at least one of: employee, manager, or system administrator.

In one embodiment, the theme 502 can be customized. That is, the particular association of theme parameters 504 with service parameters 508, and their relationship, can be changed according to a preference. In one embodiment, the preference is that of the user, and the method 300 comprises providing a user theme customization to the user, comprising providing the ability to the user to associate particular theme parameters 504 with particular service parameters 508, and define their relationship.

In one embodiment, the method 300 comprises providing a vendor theme customization, an administrator theme customization, and the user theme customization. The vendor theme customization comprises providing the ability to associate theme parameters 504 with service parameters 508, and define their relationship, to a vendor of the software components 102, for example, the first application 104. The administrator theme customization comprises providing the ability to associate theme parameters 504 with service parameters 508, and define their relationship, to a system administrator of the software component 102, the system administrator being employed by an organization having purchased a license for using the software component 102. In one embodiment, the vendor theme customization occurs before the administrator theme customization, and the administrator theme customization occurs before the user theme customization.

In one embodiment, one of the software components 102, for example, the first application 104, provides a dialog to the user, administrator or vendor to accomplish the providing of the theme customization. The user, administrator or vendor can then respond to the presented dialog to customize the theme 502.

Further embodiments are also possible, which are the result of variously combining steps, elements or embodiments described herein. For example, further embodiments may comprise an altered order of the steps of the method 300 described herein, the result of which may be an embodiment particularly suited to a specific purpose or implementation. In another example, embodiments of the method 300 may include or exclude optional steps described herein. In yet another example, different embodiments of the method 300 may be combined to create further embodiments. Additional embodiments, which would be discernable based on the description herein, are also possible.

What is claimed is:

1. A computer-readable storage medium having program instructions that, when executed by a processor, perform a method, the method comprising:
    separately executing a plurality of different applications, each application executing a corresponding query to at least one database to generate results of its query, the plurality of applications including at least one application having query results related to employees of an organization,
    storing, for each application, a plurality of service parameters that control (i) display of its corresponding query results, including the selection of a subset of the query results to display and an ordering of the display of the selected subset, and (ii) a makeup of a navigation sequence provided to the user to execute the database query;
    receiving a selection of one of a plurality of data themes by the user, wherein the selection of each of the data themes changes the value of at least one of the stored service parameters of each of the plurality of applications to at least one value corresponding to the selected data theme to control the query result subset selection and display ordering for the plurality of applications; and
    receiving a selection of one of a plurality of navigation themes by the user, wherein the selection of each navigation theme changes the value of at least one of the stored service parameters for each of the plurality of applications to at least one value corresponding to the selected navigation theme, the navigation themes including a beginner navigation theme and an advanced navigation theme, the beginner navigation theme selecting a different number of user interface states of the navigation sequence provided to execute the database query than the advanced navigation theme.

2. The computer-readable storage medium of claim 1, wherein each of the plurality of applications provides a different business functionality to the user, and the executing of the plurality of applications includes executing, for each of the plurality of applications, computer program instructions by a processor, the computer program instructions of each application being at least partially different than the computer program instructions of the other applications.

3. The computer-readable storage medium of claim 1, the method further comprising executing computer program instructions of the plurality of applications by a first processor being located at least partially in a computer workstation the user is using, wherein executing the plurality of applications includes accessing the at least one database, the database including data stored in a memory and computer program instructions executed by a second processor, the memory and the second processor being located at least partially separate from the user's computer workstation.

4. The computer-readable storage medium of claim 1, the method further comprising providing a role selection to the user, the role selection comprising selecting a role from among a plurality of available roles, the role selection determining which of a plurality of services are provided to the user by the plurality of applications, the role selection determining a predetermined data or navigation theme selection for the user, the plurality of available roles being roles of people associated with an organization, the plurality of available roles including at least one of: employee, manager, or system administrator.

5. The computer-readable storage medium of claim 1, wherein the stored plurality of service parameters for each application also control a number and type of messages displayed to the user by the application;
    the method further comprising receiving a selection of one of a plurality of usability themes by the user, wherein the selection of each usability theme changes the value of at least one of the stored service parameters for each of the plurality of applications to at least one value corresponding to the selected usability theme to control the number and type of messages displayed to the user by the plurality of applications.

6. The computer-readable storage medium of claim 1, the method further comprising:
    providing an vendor theme customization to a vendor of the plurality of applications, the vendor theme customization comprising associating data and navigation themes with service parameters by the vendor;
    providing an administrator theme customization to a system administrator of the plurality of applications, the system administrator employed by an organization having purchased a license to use the software application from the vendor, the administrator customization comprising associating data and navigation themes with service parameters by the system administrator; and
    providing a user theme customization to the user, the user theme customization comprising associating data and navigation themes with service parameters by the user,
    wherein the vendor theme customization occurs before the administrator theme customization, and the administrator theme customization occurs before the user theme customization.

7. A method, comprising:
    separately executing a plurality of different applications, each application executing a corresponding query to at least one database to generate results of its query, the plurality of applications including at least one application having query results related to employees of an organization,
    storing, for each application, a plurality of service parameters that control (i) display of its corresponding query results, including the selection of a subset of the query results to display and an ordering of the display of the selected subset, and (ii) a makeup of a navigation sequence provided to the user to execute the database query;
    receiving a selection of one of a plurality of data themes by the user, wherein the selection of each of the data themes changes the value of at least one of the stored service parameters of each of the plurality of applications to at least one value corresponding to the selected data theme to control the query result subset selection and display ordering for the plurality of applications; and receiving a selection of one of a plurality of navigation themes by the user, wherein the selection of each navigation theme changes the value of at least one of the stored service parameters for each of the plurality of applications to at least one value corresponding to the selected navigation theme, the navigation themes including a beginner navigation theme and an advanced navigation theme, the beginner navigation theme selecting a different number of user interface states of the navigation sequence provided to execute the database query than the advanced navigation theme.

8. The method of claim 7, wherein each of the plurality of applications provides a different business functionality to the user, and the executing of the plurality of applications includes executing, for each of the plurality of applications, computer program instructions by a processor, the computer program instructions of each application being at least partially different than the computer program instructions of the other applications.

9. The method of claim 7, further comprising executing computer program instructions of the plurality of applications by a first processor being located at least partially in a computer workstation the user is using, wherein executing the plurality of applications includes accessing the at least one database, the database including data stored in a memory and computer program instructions executed by a second processor, the memory and the second processor being located at least partially separate from the user's computer workstation.

10. The method of claim 7, further comprising providing a role selection to the user, the role selection comprising selecting a role from among a plurality of available roles, the role selection determining which of a plurality of services are provided to the user by the plurality of applications, the role selection determining a predetermined data or navigation theme selection for the user, the plurality of available roles being roles of people associated with an organization, the plurality of available roles including at least one of: employee, manager, or system administrator.

11. The method of claim 7, wherein the stored plurality of service parameters for each application also control a number and type of messages displayed to the user by the application; the method further comprising receiving a selection of one of a plurality of usability themes by the user, wherein the selection of each usability theme changes the value of at least one of the stored service parameters for each of the plurality of applications to at least one value corresponding to the selected usability theme to control the number and type of messages displayed to the user by the plurality of applications.

12. The method of claim 7, further comprising:

providing an vendor theme customization to a vendor of the plurality of applications, the vendor theme customization comprising associating data and navigation themes with service parameters by the vendor;

providing an administrator theme customization to a system administrator of the plurality of applications, the system administrator employed by an organization having purchased a license to use the software application from the vendor, the administrator customization comprising associating data and navigation themes with service parameters by the system administrator; and providing a user theme customization to the user, the user theme customization comprising associating data and navigation themes with service parameters by the user, wherein the vendor theme customization occurs before the administrator theme customization, and the administrator theme customization occurs before the user theme customization.

\* \* \* \* \*